United States Patent Office 3,467,718
Patented Sept. 16, 1969

3,467,718
FLUOROCARBON COMPOUNDS
Phillip G. Thompson, St. Paul, Minn., assignor to Minnesota Mining and Manufacturing Company, St. Paul, Minn., a corporation of Delaware
No Drawing. Continuation-in-part of application Ser. No. 275,473, Apr. 18, 1963. This application July 10, 1967, Ser. No. 651,988
Int. Cl. C07c 73/00
U.S. Cl. 260—610               4 Claims

ABSTRACT OF THE DISCLOSURE

Certain fluoroalkyltrioxides are disclosed herein. These compounds are oxidizing agents and are useful for the purpose of bleaching, in organic synthesis and the like.

CROSS REFERENCE TO RELATED APPLICATION

This application is a continuation-in-part of the copending application Ser. No. 275,473, filed Apr. 18, 1963, now abandoned.

DESCRIPTION OF THE INVENTION

This invention relates to certain fluorinated oxidant compounds and more particularly to certain novel fluoroalkyltrioxides.

The compounds of the invention can be represented by the formula $$R_f\text{—O—O—O—}R'_f$$

in which $R_f$ and $R'_f$ are lower fluoroalkyl radicals containing from 1 to 5 carbon atoms. Preferably the fluoroalkyl radicals are perfluoroalkyl although a small fraction, e.g. less than about 33 percent, of the fluorine atoms therein can be replaced by electronegative substituents such as chlorine.

The compounds of the invention are oxidizing agents and are useful for the purpose of bleaching, organic synthesis and the like. They are especially advantageous in that they have unique compatability with systems in which highly fluorinated solvents are used or highly fluorinated compounds are treated. The compounds, when of lower molecular weight, as, for example, containing up to about 5 carbon atoms are gases; when the alkyl radicals contained in the compounds are of higher molecular weight, the compounds are liquids. They are quite stable, and are soluble in fluorinated compounds, such as chlorofluorocarbons (including $CFCl_3$ and $CF_2Cl_2$); fluorocarbons (including $C_8F_{18}$ and perfluorobenzene) etc.

The compounds of the invention are prepared by the direct fluorination of salts of polyfluoroalkylcarboxylic acids or salts of oxalic acid. Broadly speaking, the process comprises treating a metallic salt (e.g. a lithium, sodium, potassium, magnesium calcium or aluminum salt) of the selected acid with fluorine gas preferably diluted with nitrogen or other inert gas such as helium, argon, etc. Most desirably the fluorine is present in the amount of from about 5 to 50 percent in the gas.

The reaction is carried out at temperatures ranging from about −100 to +50° C., and the products of the reaction are passed into suitable traps maintained at low temperature, e.g., by the use of liquid air or liquid nitrogen. A variety of products is thus obtained, including the compounds of the invention. For isolation, vapor phase chromatographic methods are usefully employed.

The preparation and properties of the compounds of the invention are more specifically set forth in the following examples, in which all parts are by weight unless otherwise specified.

Example 1

The sodium salt of trifluoroacetic acid is fluorinated by a static bed procedure in a brass rectangular-shaped box reactor having a sintered Monel plate suspended across it. The vessel is equipped with a gas inlet tube below the sintered plate and a gas outlet tube and brass blow-out cap above it. A 2.1 g. sample of sodium trifluoroacetate (about 15.6 millimoles) is spread out on the sintered plate in the fluorinating vessel. The reactor is flushed with nitrogen, fluorine is introduced into the nitrogen stream, and the mixture is passed into the vessel. The effluent stream is passed through an iron tube containing sodium fluoride at room temperature to remove hydrogen fluoride (which is present in commercial fluorine) and then through a trap immersed in liquid air. A stream of about 4% (by volume) of fluorine in nitrogen is passed through the reactor at a flow rate of .01 cubic ft./min. for 15 minutes, then a 20% stream at a flow rate of .007 cubic ft./min. for 1 hour, and finally a 34% stream at a flow rate of .004 cubic ft./min. for 2 hours. During this 3½ hour reaction period a total of 0.30 mole of fluorine is introduced into the reactor; the temperature inside the reactor varies from 17–22° C. The fluorine flow is discontinued and the reaction vessel is then purged with nitrogen for ½ hour. The residual material in the reactor is found to weigh about 0.6 g.; it consists principally of $NaHF_2$ and $NaF$. An alternative method of preparing the trioxides is to introduce fluorine gas slowly into a pressure vessel containing either salts of oxalic acid or salts of perfluoroalkylcarboxylic acids.

The non-condensable gases are removed from the trap at liquid nitrogen temperature under reduced pressure. The liquid air trap is found to contain 9.3 millimoles of condensed products, including bis(perfluoromethyl) trioxide and perfluoromethyl trioxide. This material is isolated in pure form from the mixture by means of vapor phase chromatography. For this process a column 8'7" in length and ½" in diameter packed with perfluorotributylamine (33%) coated on 30–60 mesh acid-washed filter aid (diatomaceous earth) (67%) and maintained at about 0° C. was used. An 8-volt thermistor was used as the detector. Helium was employed as the carrier gas at a flow rate of 130 ml./min. The pure products are obtained by passing the stream from the chromatograph exit through cooled traps as the respective components elute. The component eluting with a retention time of approximately 46 relative to $CFCl_3$ under identical chromatography conditions is bis(perfluoromethyl) trioxide.

The $F^{19}$ nuclear magnetic resonance spectrum of bis-(trifluoromethyl) trioxide contain only one peak, a singlet, with absorption at 68.7 $\phi$. The infrared spectrum of this material shows the following absorptions: $7.78\mu(S)$, $8.03\mu(S)$, $8.60\mu(S)$, $9.19\mu(W)$, $11.21\mu(M)$, $12.98\mu(M)$ and $14.38\mu(W)$. The relative intensities of the absorptions are indicated by the symbols S, M and W standing for Strong, Medium and Weak, respectively.

Bis(perfluoromethyl) trioxide is reasonably stable thermally at room temperature. A sample which stood at room temperature for twelve weeks was found to undergo only slight decomposition. Analytical data on two samples of chromatographed bis(perfluoromethy) trioxide is as follows:

Calculated for $C_2F_6O_3$: C, 12.9%; F, 61.3%. Found: C, 13.0, 13.1; F, 60.4, 61.6.

A molecular weight determination on this material gives a value of 192; the calculated value is 186. The compound is a colorless gas at room temperature.

Example 2

A higher boiling component of the products described in Example 1 eluted at an approximate retention time of 150–160 relative to $CFCl_3$. This component is perfluoromethyl perfluoroethyl trioxide.

The $F^{19}$ nuclear magnetic resonance spectrum of perfluoromethyl perfluoroethyl trioxide contains an absorption at 68.7$\phi$, which is assigned to the $CF_3$ group attached to an oxygen atom. This absorption is a singlet indicating that the coupling constant between the $CF_3$ group and the $CF_2$ group separated by the three oxygen atoms is less than approximately 1 cycle per second. Other absorptions are observed at 96.4$\phi$ (split into a quadruplet) for the $CF_2$ group and 83.8$\phi$ (split into a triplet) for the $CF_3$ group not attached to oxygen. The coupling constant between the $CF_2$ and adjacent $CF_3$ group is approximately 1.5 c.p.s. The infrared spectrum of this material shows the following absorptions: 7.26$\mu$(W), 7.77$\mu$(S), 8.06$\mu$(VS), 8.32$\mu$(S), 8.52$\mu$(S), 9.28$\mu$(S), 10.96$\mu$(W) and 13.41$\mu$(M). The relative intensities of the absorptions are represented by the symbols V, S, M and W which stand for Very, Strong, Medium and Weak, respectively.

Elemental analysis and molecular weight of a sample of chromatographed perfluoromethyl perfluorethyl trioxide were as follows:

Calculated for $C_2F_8O_3$: Mol. wt., 232.1%; C, 15.0%; F, 62.4% (containing 4 wt. percent $CFCl_3$). Found: Mol. wt., 233.9%; C, 15.0%; F, 62.0.

The calculated valves are adjusted for 4 weight percent $CFCl_3$ which was inadvertently introduced into the sample while it was being transferred on the vacuum line. The amount of $CFCl_3$ was determined by both mass spectroscopy and infrared quantitative analysis.

Example 3

A higher boiling component of the products described in Example 1 eluted at an approximate retention time of 400 relative to $CFCl_3$. This component is bis(perfluoroethyl) trioxide.

The $F^{19}$ nuclear magnetic resonance spectrum of bis-(perfluoroethyl) trioxide contains an absorption at approximately 83$\phi$, which is assigned to the $CF_3$ group and an absorption at approximately 95$\phi$, which is assigned to the $CF_2$ moiety. The relative area ratio of the 83$\phi$:95$\phi$ peaks is approximately 3:2.

What is claimed is:
1. A compound of the formula

$$R_f—O—O—O—R'_f$$

wherein $R_f$ and $R'_f$ are lower fluoroalkyl radicals.
2. Bis-trifluoromethyl trioxide according to claim 1.
3. Perfluoromethyl perfluoroethyl trioxide according to claim 1.
4. Bis-perfluoroethyl trioxide according to claim 1.

References Cited

Ginsburg et al.: ªDoklady Aka. Nauk SSR 149, No. 1, pp. 97–99 (1963).

BERNARD HELFIN, Primary Examiner

W. B. LONE, Assistant Examiner

U.S. Cl. X.R.

252—186